(12) United States Patent
Acker

(10) Patent No.: US 8,523,001 B2
(45) Date of Patent: Sep. 3, 2013

(54) THERMAL EXPANSION/SURGE REDUCTION WATER TANK

(75) Inventor: Larry K. Acker, Costa Mesa, CA (US)

(73) Assignee: Advanced Conservation Technology Distribution, Inc., Costa Mesa, CA (US)

( * ) Notice: Subject to any disclaimer, the term of this patent is extended or adjusted under 35 U.S.C. 154(b) by 282 days.

(21) Appl. No.: 12/632,733

(22) Filed: Dec. 7, 2009

(65) Prior Publication Data

US 2011/0132904 A1 Jun. 9, 2011

(51) Int. Cl.
*F17C 1/00* (2006.01)

(52) U.S. Cl.
USPC ............ 220/584; 581/720; 581/721; 581/723

(58) Field of Classification Search
USPC .................... 220/584, 720, 721, 723; 138/30
See application file for complete search history.

(56) References Cited

U.S. PATENT DOCUMENTS

| | | | | |
|---|---|---|---|---|
| 1,370,123 A * | 3/1921 | Knox | | 220/573.1 |
| 2,389,791 A * | 11/1945 | Lippincott | | 138/30 |
| 2,893,433 A * | 7/1959 | Macduff | | 138/30 |
| 3,524,475 A * | 8/1970 | Kirk, Jr. | | 138/30 |
| 3,621,882 A * | 11/1971 | Kupiec | | 138/30 |
| 3,628,573 A * | 12/1971 | Loliger et al. | | 138/30 |
| 3,931,834 A * | 1/1976 | Caillet | | 138/30 |
| 3,948,287 A * | 4/1976 | Sugimura et al. | | 138/30 |
| 4,474,215 A * | 10/1984 | Richter et al. | | 138/30 |
| 4,595,037 A * | 6/1986 | LeBreton et al. | | 138/30 |
| 4,637,435 A * | 1/1987 | Chirdon | | 138/30 |
| 4,777,983 A * | 10/1988 | Steveley | | 138/30 |
| 5,176,178 A * | 1/1993 | Schurter et al. | | 138/30 |
| 5,386,925 A * | 2/1995 | Lane | | 220/530 |
| 5,584,316 A | 12/1996 | Lund | | |
| 6,041,820 A * | 3/2000 | Boehme | | 138/30 |
| 6,517,117 B1 * | 2/2003 | Lai | | 285/202 |
| 6,915,922 B2 * | 7/2005 | Wang | | 220/720 |
| 8,033,416 B2 | 10/2011 | Wang | | |
| 2005/0017016 A1 * | 1/2005 | Lombari | | 220/721 |
| 2008/0173357 A1 | 7/2008 | Acker | | |
| 2008/0230126 A1 | 9/2008 | Acker | | |
| 2008/0230134 A1 * | 9/2008 | Lai | | 138/30 |

* cited by examiner

Primary Examiner — Anthony Stashick
Assistant Examiner — Chetan Chandra
(74) Attorney, Agent, or Firm — Carlos A. Fisher

(57) ABSTRACT

A thermal expansion/surge reduction water tank includes a hollow housing with a bladder sealed to an inside of the housing forming two compartments therein. A compressed air inlet in communication with a first of the compartments is provided for expanding the first compartment by focusing the bladder into an abutting relationship with the housing inside. A water inlet and a water outlet in communication with a second of the compartments is provided and disposed for causing non-laminar flow of water through the second compartment for both expanding the second compartment by forcing said bladder into the first compartment and flushing the second compartment to effect self-cleaning thereof. A plurality of protuberances disposed on a side of said bladder facing the second compartment are provided for preventing sealing of the bladder in an area of abutment with the housing inside between the water inlet and outlet thereby enabling fluid flow between the water inlet and outlet with said bladder abutting the housing inside.

13 Claims, 2 Drawing Sheets

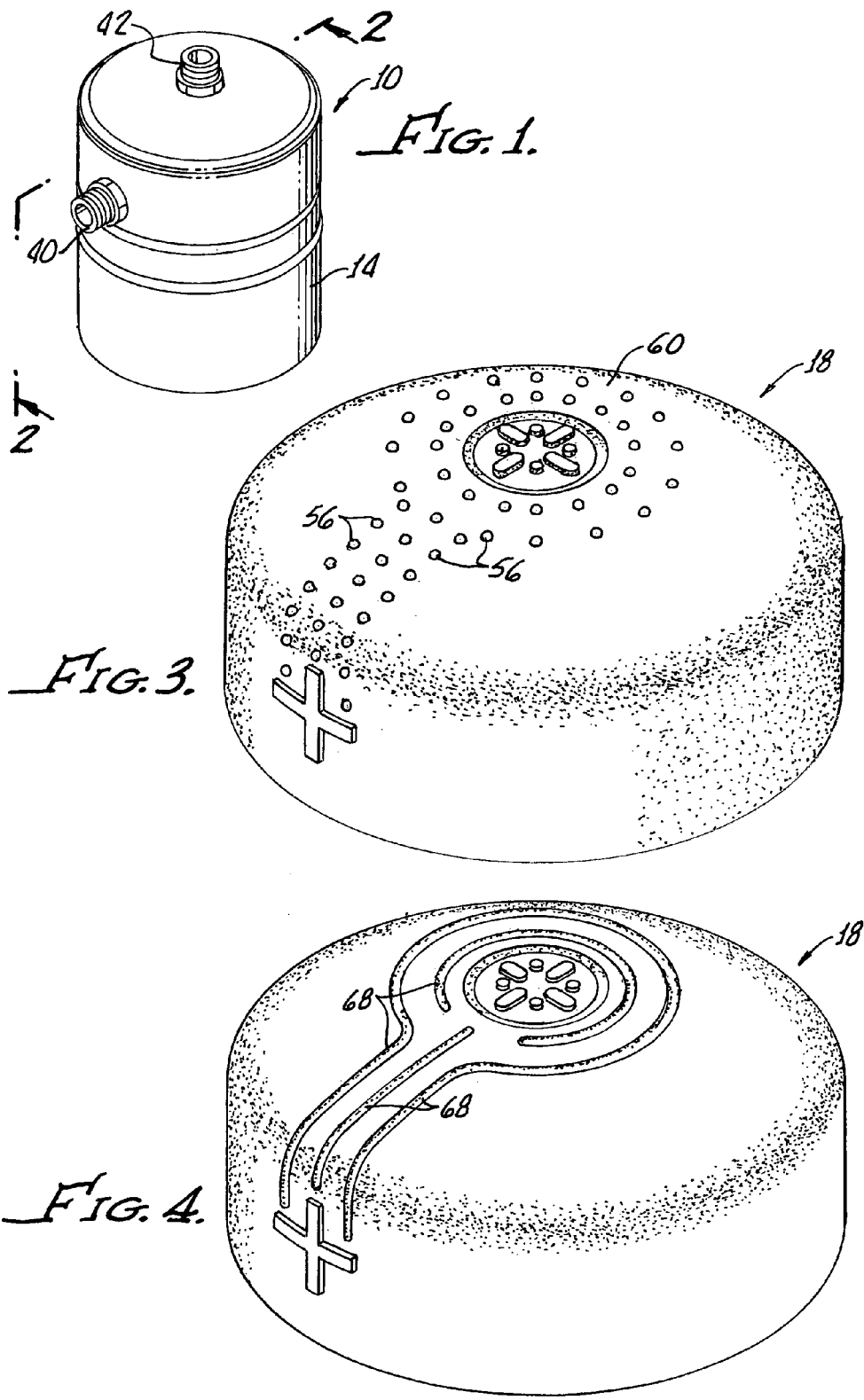

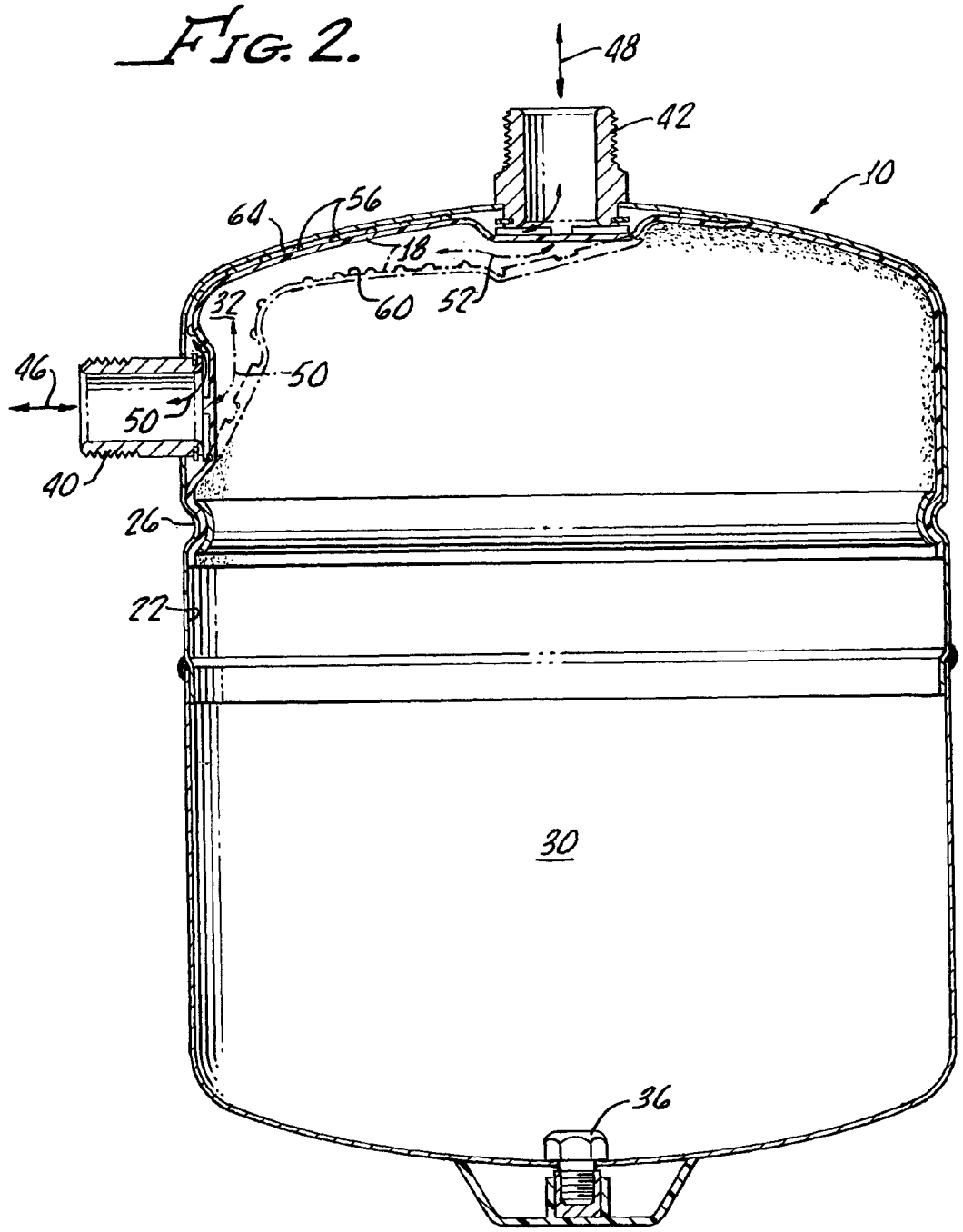

THERMAL EXPANSION/SURGE REDUCTION WATER TANK

The present invention is generally related to hot water systems and is more particularly directed to thermal expansion/surge reduction water tanks utilizing a compressible volume of air to prevent or relieve the buildup of pressure.

Temperature variations within closed water systems occur in both commercial and residential buildings. While most water heater systems utilize check valves or pressure-rated vessels for eliminating safety concerns caused by pressure fluctuations, the efficiency issue is still present. As hereinabove noted, water heaters generally incorporate a pressure relief valve to prevent excessive pressure buildup but unfortunately release of water from these valves results from generally uncontrolled release of water from the water heater which most likely may cause damage to surrounding structure. In addition, once a pressure relief valve is opened, it may not seal properly again thereby providing a continuous leak.

In addition, when the hot water systems are subject to "water hammer", which is a pounding noise or vibration developed in the piping system, when non-compressible water flowing through a pipe at a given pressure and velocity is abruptly stopped. When water hammer occurs, a high intensity pressure wave travels back through the piping system until it reaches a point of release such as a large diameter riser or piping main. The surging shock wave may oscillate within the piping system until the destructive energy is dissipated. This action accounts for piping noise and vibration and may cause ruptured piping, leaking connections, and ruptured tanks.

Attempts to eliminate these problems include the use of stand pipes, or risers, and secondary tanks utilizing compartments with air to both accommodate thermal expansion and water hammering. Unfortunately, these tanks tend to accumulate stagnant water which may contribute to health and safety issues of the plumbing system. The present invention overcomes these problems.

SUMMARY OF THE INVENTION

A thermal expansion/surge reduction in water tanks in accordance with the present invention generally includes a hollow housing along with a bladder therein sealed to an inside of the housing for forming two compartments therein.

A compressed air inlet is provided in communication with a first of the compartments for expanding the first compartment by forcing a bladder into an abutting relationship with the housing inside.

A water inlet and a water outlet are provided in communication with a second of the compartments and disposed for causing non-laminar flow of water through the second compartment for both expanding the second compartment by forcing the bladder into the first compartment and flushing the second compartment to effect self-cleaning thereof. Thus, the action of the bladder movement accommodates for both thermal expansion and the surge reduction to prevent water hammer, A plurality of protuberances are provided and disposed on one side of the bladder facing the second compartment for preventing sealing of the bladder in an area of abutment with the housing inside between the water inlet and the water outlet thereby enabling fluid flow between the water inlet and the water outlet with the bladder abutting the housing inside.

In this manner, the bladder is prevented from sealing against the housing inside which may restrict the flow of small amounts of water through.

In the present invention, the fluid inlet and fluid outlet are oriented at an acute angle with one another in order to ensure that water flowing through the second chamber occurs in a turbulent or a non-laminar manner.

Preferably, the plurality of protuberances are molded into the bladder and may be spaced apart discrete protuberances or be formed as a spaced apart ribs.

BRIEF DESCRIPTION OF THE DRAWINGS

The advantages and features of the present invention will be better understood by the following description when considered in conjunction with the accompanying drawings in which:

FIG. 1 is a prospective view of a thermal expansion/surge reduction water tank in accordance with the present invention generally showing a housing having a water inlet fitting and a water outlet fitting disposed at an acute angle with respect to one another;

FIG. 2 is a cross sectional view of the tank taken along the line 2-2 of FIG. 1 showing a bladder sealed within the housing and forming two compartments therein with the bladder shown (solid line) in an abutting relationship with the housing inside upon inflation through a compressed air inlet and a displaced bladder shown (dashed line) during a water flow, thermal expansion, or water hammer;

FIG. 3 is a perspective view of a bladder disposable and sealable within the housing shown in FIG. 1 illustrating a plurality of protuberances as described hereinafter in greater detail; and FIG. 4 is an alternative embodiment of the present invention in which the protuberances on the bladder are formed in a rib-like manner.

DETAILED DESCRIPTION

With reference to FIGS. 1 and 2, there is shown a thermal expansion/surge reduction water tank 10 in accordance with the present invention generally showing a hollow housing 14 having a bladder 18 sealed to a housing inside 22 at a perimeter 26 thereby forming a first compartment 30 and a second compartment 32 within the hollow housing 14.

A compressed air inlet 36 is provided in communication with a first compartment 30 for inflating the bladder 18 into an abutting relationship with the housing inside as shown in solid line in FIG. 2. Fittings 40, 42 provide for water inlet and outlet from the tank 10 with the water flow therebetween being indicated by arrows 46, 48, 50, 52.

Because the fittings 40, 42 are disposed at an acute angle, for example, 90 degrees as shown in FIG. 2, the flow of water through the second compartment will be non-laminar thus causing a roiling or churning action within the second compartment with such turbulence effecting self-cleaning of the second compartment 20 including the bladder 18, thus eliminating any possibility of accumulation of stagnant water within the tank 10.

With reference to FIGS. 2 and 3, the bladder 18, which may be formed from any suitable material, includes a plurality of protuberances 56 disposed on a side 60 facing the second compartment 32 which prevents sealing of the bladder 18 in an abutment area 64 between the fittings 40, 42 to enable fluid flow between the fittings 40, 42 with the bladder 18 abutting the housing inside 22 as illustrated in solid line in FIG. 2. Thus, even without high water flow or pressure displacing the bladder 18 into the first compartment 30, as illustrated in dashed line in FIG. 2, a small amount of water can still traverse the second compartment between the fittings 40, 42.

The position of the bladder 18 during water flow is, of course, dependent upon the initial pressure of compressed air introduced into the first compartment 30, typically 15 psi is a typical pressure suitable for the bladder 18 to absorb or move during thermal expansion or water hammer which is cushioned by the bladder 18 acting against the compressed air in the first compartment 30.

The protuberances 56 may be molded into the bladder during manufacture thereof or attached separately as a spaced apart discrete protuberances 56.

Alternatively, as illustrated in FIG. 4, the protuberances 68 may be in the form of ribs allowing the passage of water between the fittings 40, 42 in the area of abutment 64.

Although there has been hereinabove described a specific tank in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A thermal expansion/surge reduction water tank comprising:
   a) a hollow housing;
   b) a bladder sealed to an inside of the housing forming two compartments therein;
   c) a compressed air inlet in communication with a first of the compartments for expanding the first compartment by forcing said bladder into an abutting relationship with an upper inside surface of the hollow housing;
   d) a water inlet and a separate water outlet both in fluid communication with a second of the compartments, the orientation of the water inlet and the water outlet to each other being structured to produce one-way non-laminar flow of water from the inlet to the outlet through the second compartment upon application of water pressure through the water inlet, thereby flushing the second compartment with water through said outlet to effect self-cleaning thereof and expanding the second compartment by forcing said bladder into the first compartment;
   e) a plurality of protuberances disposed on a side of said bladder facing the second compartment and extending along a portion thereof abutting said upper inside surface of the hollow housing between said inlet and said outlet in order to prevent sealing of said bladder to the inside surface of said housing; and
   f) a plurality of fluid channels between said bladder and said housing in an abutment area between said inlet and said outlet, formed by said protuberances when water pressure does not displace the bladder into the first compartment, thereby enabling continued fluid flow between the water inlet and separate water outlet with said bladder abutting the housing inside.

2. The tank according to claim 1 wherein a fluid inlet and a fluid outlet are perpendicularly oriented with one another.

3. The tank according to claim 1 wherein said plurality of protuberances are molded into said bladder.

4. The tank according to claim 1 wherein said plurality of protuberances are spaced apart discrete protuberances.

5. The tank according to claim 1 wherein said plurality of protuberances comprises spaced apart ribs, the protuberances forming a channel for water flow between the water inlet and water outlet when said bladder abuts the housing.

6. A thermal expansion/surge reduction water tank comprising:
   a) a hollow housing;
   b) a fluid inlet;
   c) a fluid outlet separate from the fluid inlet;
   d) a compressed air inlet;
   e) a bladder sealed to an inside of the housing having the fluid inlet and fluid outlet spaced apart from one side of the bladder and the air inlet spaced apart from another side of said bladder, wherein introduction of compressed air into the housing through the air inlet causes said bladder to abut an abutment area of said housing inside surface between the fluid inlet and said fluid outlet; and
   f) a plurality of fluid channels between said bladder and said housing; said channels formed by a plurality of protuberances disposed on a side of said bladder facing said abutment area between said inlet and said outlet when water pressure through said fluid inlet does not prevent said bladder from abutting said abutment area of said housing, thereby enabling continued fluid flow between the fluid inlet and the separate fluid outlet with said bladder abutting the abutment area of said housing.

7. The tank according to claim 6 wherein a fluid inlet and a fluid outlet are perpendicularly oriented with one another.

8. The tank according to claim 6 wherein said plurality of protuberances are molded into said bladder.

9. The tank according to claim 6 wherein said plurality of protuberances are spaced apart discrete protuberances.

10. The tank according to claim 6 wherein said plurality of protuberances comprises spaced apart ribs.

11. A thermal expansion/surge reduction water tank comprising:
    a) a hollow housing;
    b) a fluid inlet;
    c) a fluid outlet separate from the fluid inlet;
    d) a compressed air inlet;
    e) a bladder sealed to an inside of the housing having the fluid inlet and fluid outlet spaced apart from one side of the bladder and the air inlet spaced apart from another side of said bladder, wherein introduction of compressed air into the housing through the air inlet causes said bladder to abut said housing in an abutment area inside surface between the fluid inlet and said fluid outlet; and
    f) a plurality of fluid channels between said bladder and said housing; said channels formed by a plurality of protuberances disposed on a side of said bladder facing said abutment area between said inlet and said outlet when water pressure through said fluid inlet does not prevent said bladder from abutting said abutment area of said housing, thereby enabling fluid flow between the fluid inlet and the separate fluid outlet with said bladder abutting the abutment area of said housing.

12. The tank according to claim 11 wherein said plurality of protuberances comprise spaced apart ribs.

13. A water tank, comprising:
    a hollow housing comprising a top and a bottom;
    a flexible bladder sealed to an inside of the hollow housing defining an upper volume between the flexible bladder and the top of the hollow housing, and defining a lower volume between the flexible bladder and the bottom of the hollow housing;
    a fluid inlet connected to the top of the hollow housing in fluid communication with the upper volume;

a separate fluid outlet connected to the top of the hollow housing in fluid communication with the upper volume;

a compressed air inlet connected to the bottom of the hollow housing in pneumatic communication with the lower volume; and a plurality of fluid channels between said bladder and said housing; said channels formed by a plurality of protuberances disposed on a side of said bladder facing an abutment area of an inside surface of said housing between said fluid inlet and said outlet when said bladder abuts said abutment area of said housing.

\* \* \* \* \*